(12) United States Patent
Warrier (10) Patent No.: US 10,419,532 B2
(45) Date of Patent: Sep. 17, 2019

(54) ASYNCHRONOUS CONNECTION HANDLING IN A MULTI-THREADED SERVER

(71) Applicant: Oracle International Corporation, Redwood Shores, CA (US)

(72) Inventor: Suresh Warrier, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 122 days.

(21) Appl. No.: 15/460,852

(22) Filed: Mar. 16, 2017

(65) Prior Publication Data

US 2018/0270304 A1    Sep. 20, 2018

(51) Int. Cl.
*H04L 29/08*    (2006.01)

(52) U.S. Cl.
CPC .......... *H04L 67/1008* (2013.01); *H04L 67/02* (2013.01); *H04L 67/145* (2013.01)

(58) Field of Classification Search
CPC ..... H04L 63/0471; H04L 63/12; H04L 67/02; H04L 67/2852; G06F 15/16; G06F 11/1464; G06F 11/30
USPC ........................................................ 709/224
See application file for complete search history.

(56) References Cited

U.S. PATENT DOCUMENTS

| | | | |
|---|---|---|---|
| 6,223,201 B1 * | 4/2001 | Reznak ................. | G06F 9/4843 718/102 |
| 7,930,443 B1 * | 4/2011 | Sullivan ................. | G06F 9/461 710/20 |
| 8,180,973 B1 * | 5/2012 | Armangau ............ | G06F 9/5033 709/225 |
| 8,578,390 B2 * | 11/2013 | Dillow .................... | G06F 9/546 379/221.08 |
| 9,411,636 B1 * | 8/2016 | Ting ...................... | G06F 9/4843 |

(Continued)

OTHER PUBLICATIONS

Douglas C. Schmidt et aL, "Half-Sync/Half-Async an Architectural Pattern for Efficient and Well-structured Concurrent I/O", Department of Computer Science Washing University St. Louis, MO, ISBN 0-201-89527-7, 1996, 11 pages.

Uwe Zdun et al., "Pattern-Based Design of an Asynchronous Invocation Framework for Web Services" International Journal of Web Service Research, vol. 1, No. 3, 2004, 14 pages.

Unknown, "Multi-threaded applications and asynchronous I/O", 7 pages, retrieved on Mar. 30, 2016 from: <http://libusb.sourceforge.net/api-1.0/mtasync.html>.

(Continued)

*Primary Examiner* — Tesfay Yohannes
(74) *Attorney, Agent, or Firm* — Tucker Ellis LLP (57) ABSTRACT

In accordance with an embodiment, described herein is a system and method for providing an asynchronous architecture in a server with an existing synchronous architecture. The system can include a keep-alive subsystem and a user-level request context switching application programming interface (API). A plurality of connections can be received at the keep-alive subsystem, and each connection can be assigned a request context configured to be executed in the keep-alive subsystem. When a connection being executed by a thread is blocked for I/O, the request context assigned to the connection can be saved, and the request context assigned to another connection can be restored to be executed by the thread. Resources associated with an idle connection can be placed in a pool for reuse by other connections. The system can provide an asynchronous architecture in the server without changing existing code and functionalities of the existing synchronous architecture.

21 Claims, 7 Drawing Sheets

(56) References Cited

U.S. PATENT DOCUMENTS

| | | |
|---|---|---|
| 2009/0225093 A1* | 9/2009 | Harper .................... G06F 3/038 |
| | | 345/522 |
| 2010/0262650 A1 | 10/2010 | Chauhan |
| 2011/0131654 A1 | 6/2011 | Taneja |
| 2011/0178915 A1* | 7/2011 | Vinokour ............... G06Q 40/04 |
| | | 705/37 |
| 2012/0159235 A1 | 6/2012 | Suganthi |
| 2014/0330976 A1 | 11/2014 | Van Bemmel |
| 2015/0341285 A1* | 11/2015 | Aysola ................ H04L 63/0428 |
| | | 370/392 |
| 2016/0379136 A1* | 12/2016 | Chen ..................... G06F 21/552 |
| | | 706/12 |
| 2017/0017553 A1* | 1/2017 | Peleg .................. G06F 11/1464 |
| 2017/0124327 A1* | 5/2017 | Kumbhar .............. G06F 21/566 |
| 2017/0126792 A1* | 5/2017 | Halpern .............. H04L 41/0896 |
| 2017/0223200 A1* | 8/2017 | Katano .............. H04N 1/00204 |

OTHER PUBLICATIONS

Sachin More et al., "MTIO a Multi-Threaded Parallel I/O System" Proceedings 11th International Parallel Processing Symposium, Geneva, 1997, 6 pages.

The Apache Software Foundation, "Apache HTTP Server Version 2.4 Apache MPM event", 6 pages, retrieved Mar. 31, 2016 from: <https://httpd.apache.org/docs/2.4/mod/event.html>.

Ashutosh Bijoor, "Java EE threads v/s Node.js-which is better for concurrent data processing operations" Jun. 9, 2013, 12 pages, retrieved on Mar. 30, 2016 from: (http://bijoor.me/2013/06/09/java-ee-threads-vs-node-js-which-is-better-for-concurrent-data-processing-operations/>.

* cited by examiner

ASYNCHRONOUS CONNECTION HANDLING IN A MULTI-THREADED SERVER

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to server architectures, and are particularly related to a system and method for asynchronous connection handling in a multi-threaded server environment using user level context switching.

BACKGROUND

In a client-server environment, a server can be a computer program that provides functionality for other programs called clients. Generally, a server can use two types of architectures to process connection requests from a client. In an asynchronous architecture, each thread in the server can manage multiple connections, and in a synchronous architecture, each connection can be processed by a dedicated thread in the server. The two types of architectures can be mutually exclusive, and a complete code rewrite may be needed to switch between the two types of architectures.

SUMMARY

In accordance with an embodiment, described herein is a system and method for providing an asynchronous architecture in a server with an existing synchronous architecture. The system can include a keep-alive subsystem and a user-level request context switching application programming interface (API). A plurality of connections can be received at the keep-alive subsystem, and each connection can be assigned a request context configured to be executed in the keep-alive subsystem. When a connection being executed by a thread is blocked for I/O, the request context assigned to the connection can be saved, and the request context assigned to another connection can be restored to be executed by the thread. Resources associated with an idle connection can be placed in a pool for reuse by other connections. The system can provide an asynchronous architecture in the server without changing existing code and functionalities of the existing synchronous architecture.

DETAILED DESCRIPTION

As described above, in a client-server environment, a complete code rewrite may be needed to switch from a synchronous architecture to an asynchronous architecture.

In accordance with an embodiment, described herein is a system and method that can provide an alternative means for a synchronous architecture to retain existing code/functionality while bringing in behaviors and benefits of an asynchronous architecture.

In accordance with an embodiment, the system can include a keep-alive subsystem and a user-level request context switching application programming interface (API). A plurality of connections can be received at the keep-alive subsystem, and each connection can be assigned a request context configured to be executed in the keep-alive subsystem. When a connection being executed by a thread is blocked for I/O, the request context assigned to the connection can be saved, and the request context assigned to another connection can be restored to be executed by the thread. Resources associated with an idle connection can be placed in a pool for reuse by other connections. The system can provide an asynchronous architecture in the server without changing existing code and functionalities of the existing synchronous architecture.

In accordance with an embodiment, the system can support the coexistence of an asynchronous architecture and a synchronous architecture in the same server. An async-enabled request acceptor and an async-disabled request acceptor can be configured in the server. The async-enabled request acceptor can direct connections to the keep-alive subsystem, where the connections can be serviced in an asynchronous fashion. The async-disabled request acceptor can direct connections to the request processing subsystem where the connections are serviced in a synchronous fashion. The system can include a user-level context switching API that enables each thread in the keep-alive subsystem to manage multiple connections simultaneously. The request context for a connection can be executed until an I/O block is detected, at which point the request context can be swapped out and the request context of another ready connection can be swapped in for execution.

Figure 1:
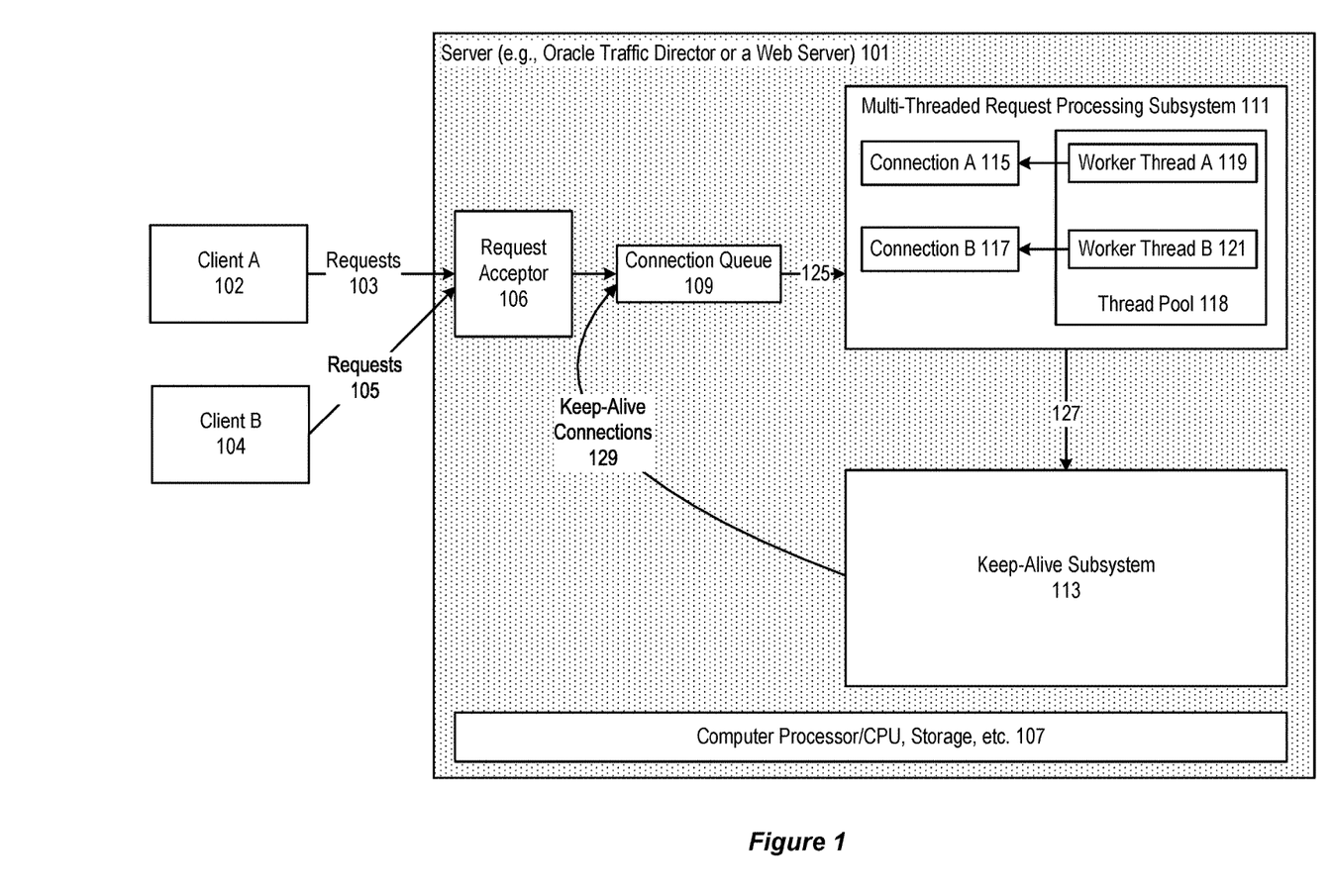
FIG. 1 illustrates a server with an asynchronous architecture, in accordance with an embodiment.

FIG. 1 illustrates a server with an asynchronous architecture, in accordance with an embodiment.

As shown in FIG. 1, the server 101, for example, an HTTP server or an Oracle™ Traffic Director, can execute on a computer processor 107; and can include a multi-threaded request processing subsystem 111, a keep-alive subsystem 113, and a request acceptor 106.

In accordance with an embodiment, the request acceptor can be an HTTP listener and can be associated with a plurality of acceptor threads in a thread pool. When a request is received over a connection (e.g., a TCP connection) at the the request acceptor, one of the plurality of acceptor threads can place the connection in a connection queue 109, from where the connections can be picked up by worker threads whose exact count determine the perceived concurrency of the server. Each worker thread in the request processing subsystem can handle one of the connections on which a request/response pair can be received and sent.

In accordance with an embodiment, each of the connections can be HTTP keep-alive connection that represents a single Transmission Control Protocol (TCP) that can be used to send and receive multiple HTTP requests/responses, as opposed to opening a new connection for every single request/response pair.

As such, when the request/response pair is completed on a connection, the connection can be dispatched by the worker thread that is handling the connection to the keep-alive subsystem 113, where the connection can be monitored for further activity.

In accordance with an embodiment, the connection can be keep-alive in the keep-alive subsystem for a configurable period of time, before the connection can be used to process additional requests from a same client.

As an illustrative example, each of client A 102 and client B 104 can send multiple requests 103, 105 over a connection to the server. The connections used by client A and client B can be placed on the connection queue, and can be dequeued 125 by worker threads from a thread pool 118.

For example, worker thread A 119 in the thread pool can dequeue connection A 115 and process requests sent over the connection in the request processing subsystem. Similarly, worker thread B 121 can dequeue connection B 117 and process requests sent over the connection in the request processing subsystem.

After a connection finishes processing a request in the request processing subsystem, the connection can be moved 127 from the request processing subsystem to the keep-alive subsystem, where the connection can be kept alive for a configurable period of time, and can be put back 129 on the connection queue to process additional requests directed to the request processing subsystem.

In accordance with an embodiment, the keep-alive subsystem can reduce the time and overhead associated with creating and closing TCP connections for future requests. A keep-alive connection can continue to be reused until either the client or the server decides that the conversation is over and drops the connection.

The server described above allows linear and simpler programming and relatively straightforward debugging; and can leverage advances in kernel implementations that directly address context switching overhead by using the operating system to perform context switching/scheduling responsibilities.

However, in such as a server, scalability can suffer as increased loads can translate to a bulkier process image with at least as many threads of execution as there are concurrent active requests. Further, shared resources such as a connection queue or pool may emerge as contention points as the number of worker threads increase to deal with increasing work loads. Even if such issues were ignored, a dynamic tuning of worker threads to tackle varying load conditions can present enough challenges so as to force manual reconfigurations a necessity.

Furthermore, each thread in the thread pool can handle one connection. The thread may sit idle after issuing an I/O request and wait for the I/O request to complete. As such, the thread can be prevented from performing additional work when an I/O request is pending, which can reduce system throughput.

Architecture Conversion

A server as described above can rely on increasing the number of threads to deal with increased load demands. The threads may be static, which requires a server configuration or a server restart for newly increased threads to be effective. However, with a code rewrite, the server can be switched from a synchronous architecture to an asynchronous architecture.

In accordance with an embodiment, the system and method described herein can convert a synchronous architecture in a server to an asynchronous architecture without changing existing code and functionality of the server. Embodiments of the invention can be applied to a plurality of multi-threaded blocking or synchronous architecture, for example, Apache web server, and Oracle Traffic Director.

In accordance with an embodiment, the system can include a keep-alive subsystem and a user-level request context switching application programming interface (API). A plurality of connections can be received at the keep-alive subsystem, and each connection can be assigned a request context configured to be executed in the keep-alive subsystem. When a connection being executed by a thread is blocked for I/O, the request context assigned to the connection can be saved, and the request context assigned to another connection can be restored to be executed by the thread. Resources associated with an idle connection (e.g., requests contexts and associated stack memory) can be placed in a pool for reuse by other connections.

In accordance with an embodiment, a connection can be considered idle when no more requests are expected on the connection.

In accordance with an embodiment, the system enables a thread to handle multiple request contexts by invoking a user-level context-switching API. With this approach, the system can resemble a user-level multi-threading implementation where scheduling is governed by I/O events rather than time slices, thread priorities, etc.

In accordance with an embodiment, states of a request can continue to be stored on a stack that is associated with the request, rather than with a thread that is processing the request. Existing features/code can remain unmodified, while scalability of the server is no longer dependent on the number of threads which the server process can support.

In accordance with an embodiment, each request context can be executed until an I/O block is detected, at which point the request context can be swapped out and the request context of another ready connection can be swapped in. Each keep-alive thread in the keep-alive subsystem can act as a user-level multi-threading mechanism where criteria for scheduling are I/O readiness. The keep-alive subsystem can retain existing responsibilities of monitoring persistent connections, and front-ending the accelerator cache.

As such, the user-level context switching API can enable each keep-alive thread in the server to manage multiple connections simultaneously, which can result in increased concurrency and scalability for a same number of threads.

In accordance with an embodiment, by default, the context switch API can include custom assembly routines configured to save and restore request contexts. The custom assembly routines can perform request contexts swapping without using one or more costly system calls, for example, a sigprocmask( ) call, thus improving performance compared to assembly routines provided an operating system on the server.

Further, kept-alive connections that are idle can have their associated resources, for example, request contexts and stack memory, recycled. For example, the resources can be disassociated with the connections, and put in a resource pool for reuse by other connections, thereby improving resource usage efficiency compared to a synchronous architecture.

Advantageous of the system can include providing benefits of an asynchronous architecture in a synchronous architecture, improving scalability and server concurrency, improving memory/resource usage as compared to a multi-threaded synchronous architecture, retaining existing functionality and while switching basic I/O handling from a synchronous architecture to an asynchronous architecture.

Compared to other asynchronous architectures, such as HAProxy and Nginx, which may be single-threaded and require them to be deployed in a multi-process mode to exploit available hardware concurrency, the system provides an asynchronous multithreaded architecture that can handle multiple request contexts by each thread, thus enabling the system to operate within a single process.

Figure 2:
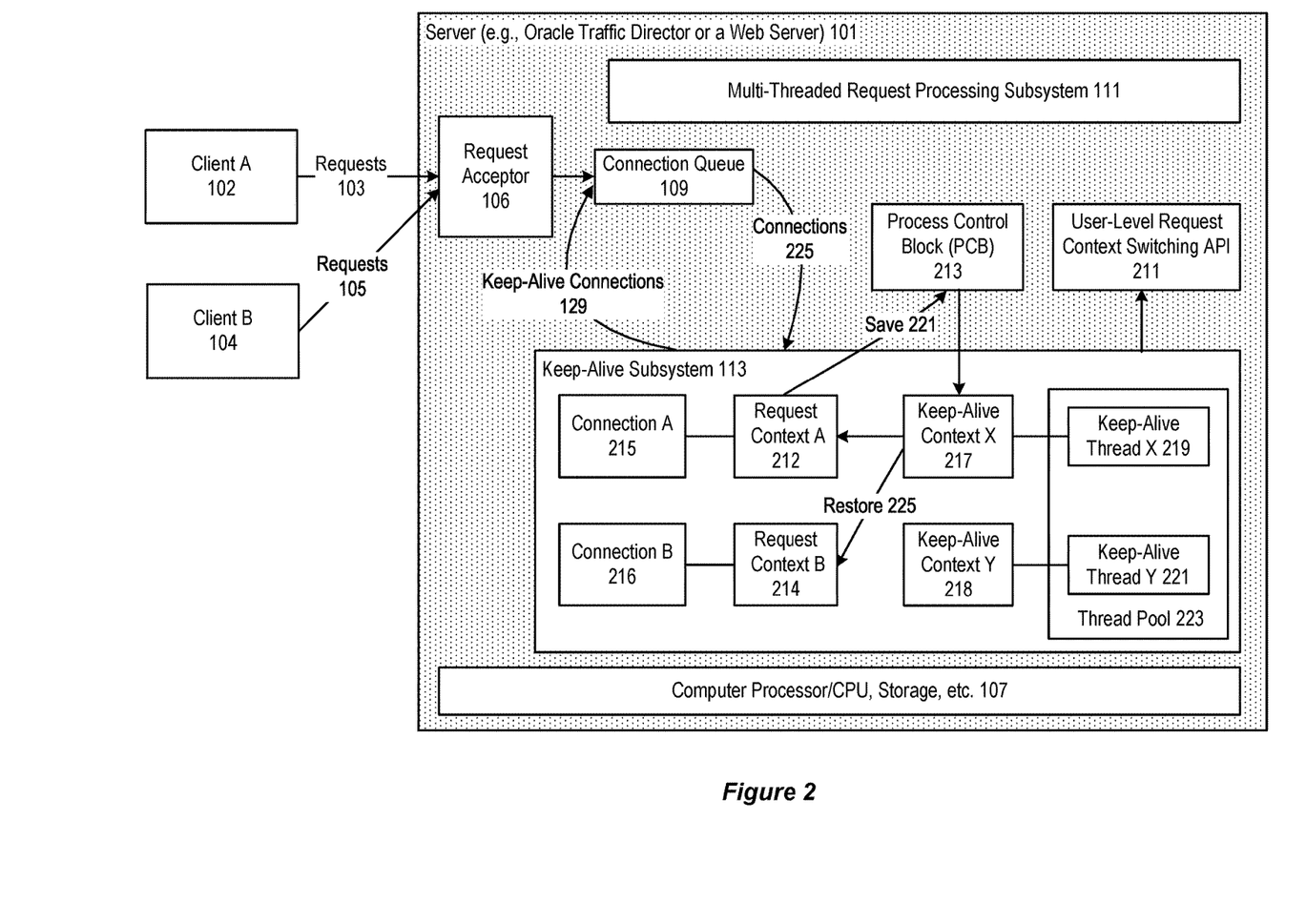
FIG. 2 illustrates a system for converting a synchronous architecture in a server to an asynchronous architecture, in accordance with an embodiment.

FIG. 2 illustrates a system for converting a synchronous architecture in a server to an asynchronous architecture, in accordance with an embodiment.

As shown in FIG. 2, the keep-alive subsystem 113 can receive 225 connections, for example, connection A 215 and connection B 216, from the connection queue 109. Each new connection received at the keep-alive subsystem can be assigned a request context, for example, request context A 212 and request context B 214.

In accordance with an embodiment, a thread pool 223 can include a plurality keep-alive threads, for example, keep-alive thread X 219 and keep-alive thread Y 221. Each keep-alive thread can be a user-level thread that is scheduled to run within a process's time slices, and can share code, data and heap within the process.

In accordance with an embodiment, each keep-alive thread can be associated with a keep-alive context, for example, keep-alive context A 217 and keep-alive context 218. Each keep-alive context can be a context that a corresponding keep-alive thread is born with.

In accordance with an embodiment, a keep-alive context can be configured to monitor a poll array for active file descriptors, restore request contexts associated with active file descriptors, supporting asynchronous condition variables by monitoring a list of condition waiters (a set of request contexts that are currently waiting on a condition), and restoring request contexts associated with condition waiters (that have either timed out, or whose condition has been signaled).

In accordance with an embodiment, each time a request context is restored, the current keep-alive context is saved. Upon each return to the keep-alive context, the status of the swapped-out request context can be inspected. If a request context was swapped out due to I/O block, the blocked file descriptor can be added to a list of pollables managed by the associated keep-alive thread.

In accordance with an embodiment, for each active file descriptor, the keep-alive subsystem can determine whether the associated connection is a new connection or an existing connection. If it is a new connection, the keep-alive subsystem can save the keep-alive context associated with the keep-alive thread managing the new connection, and create and start a new request context for the request received on the new connection. If the associated connection is an existing connection, the keep-alive subsystem can save the keep-alive context associated with the keep-alive thread managing the existing connection, and restore a saved request context. Similarly, for each condition waiter, the keep-alive subsystem can determine if a condition is true. If it is true, the keep-alive subsystem can save a keep-alive context and restore a saved request context. If it is not true, the keep-alive subsystem can continue.

In accordance with an embodiment, if the last HTTP transaction has completed, the file descriptor associated with the request context can be added to a list of pollables and can be monitored for further activity. If a session has completed (i.e. no more requests are expected on a connection), the associated request context can be freed (or pooled for reuse).

In accordance with an embodiment, a user level request context switching API 211 can be used to manage context switches by saving and restoring execution states of the request contexts. The user-level request context switching API can include a UNIX-provided context manipulation routines, for example, get, set, swap and makecontext; or ported variations of the context manipulation routines on Windows.

In an alternative embodiment, the user-level request context switching API can include custom assembly routines configured to save and restore request contexts.

As used herein, in an accordance with an embodiment, a user-level request context can be a hardware context of a running thread at any given instant, i.e. a register dump that consists of pertinent register values necessary to restore the saved request context.

In accordance with an embodiment, each of the request contexts can be created for a new request received on a connection, and can be managed by a keep-alive thread. A request context can track the flow of the execution of a request from the request header processing to the completion of the request. A user-level request context can be associated with or disassociated from a connection.

In accordance with an embodiment, each connection received at the keep-alive subsystem has its associated request context executed in the keep-alive subsystem. Whenever a connection is blocked for I/O, the request context of the connection can be saved and the request context of another ready connection can be restored. The code executed for each request context can be the same code executed by the request processing subsystem 111.

Referring to FIG. 2, when connection A is blocked for I/O during its execution by keep-alive thread A 219, request context A 212 can be saved 221 to a process control block (PCB) 213, and request context B 214 assigned to connection B 216 can be restored 225 from the PCB for execution by keep-alive thread A, thereby enabling keep-alive thread A to manage multiple request contexts. Since each request context is assigned to a different connection, the keep-alive subsystem can effectively handle multiple connections using a single keep-alive thread, which results in increased concurrency and scalability for the same number of keep-alive threads.

In accordance with an embodiment, when a request context is swapped out on a I/O block, the keep-alive context associated with the keep-alive thread managing the request context can be restored, and can continue where it left off, monitoring pollable file descriptors and condition waiters while restoring a different request context that is new or has turned ready for I/O.

As an illustrative example, in FIG. 2, when request context A 212 blocks on I/O, the request context can be saved or switched out. Keep-alive context X 218 associated with keep-alive thread X 219 can be restored for use in restoring request context B 214.

In accordance with an embodiment, the asynchronous architecture does not use stack memory for idle connections; only active connections consume resources such as request contexts and associated stack memory.

Compared to a traditional architecture where, for example, a "hung" backend can block one or more threads, the system can provide better scalability and server concurrency while retaining a fixed/same number of processing threads.

Figure 3:
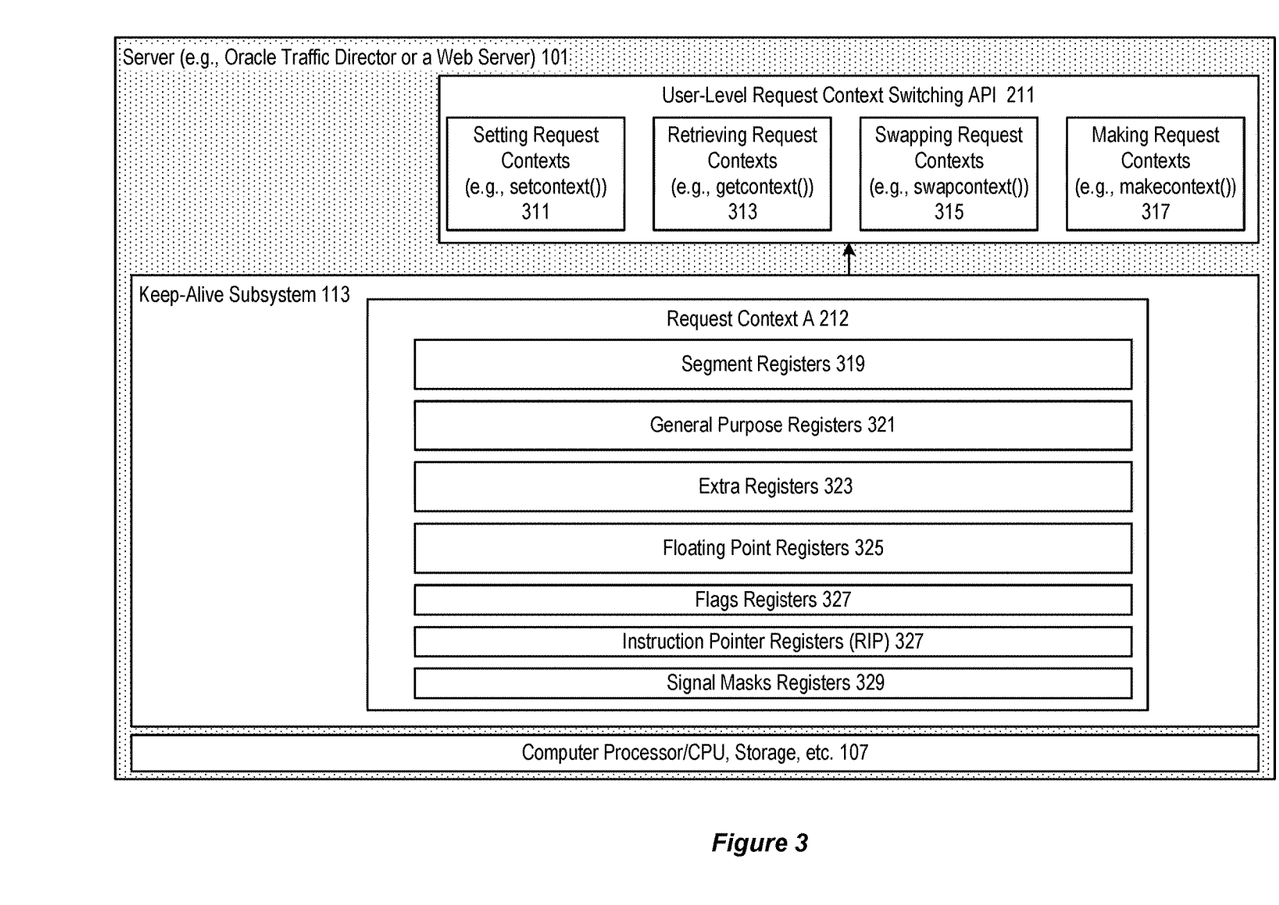
FIG. 3 further illustrates a system for converting a synchronous architecture in a server to an asynchronous architecture, in accordance with an embodiment.

FIG. 3 further illustrates a system for converting a synchronous architecture in a server to an asynchronous architecture, in accordance with an embodiment.

More particularly, FIG. 3 illustrates an exemplary request context, and an exemplary user-level request context switching API, in accordance with an embodiment.

As shown in FIG. 3, in accordance with an embodiment, request context A 212 can be created for a new request; and can include values from one or more segment registers 319, one or more general purpose registers 321, one or more extra registers 323, one or more floating point registers 325, one or more flags registers 327, one or more instruction pointer registers 327, and one or more signal masks registers 329.

In accordance with an embodiment, the values from the plurality of registers can represent a hardware context of a running thread at any given instant, i.e. a register dump that consists of pertinent register values that are necessary to restore saved request contexts.

As further shown in FIG. 3, the user-level request context switching API 211 can include functions for setting request contexts 311, retrieving request contexts 313, swapping request contexts 315, and making request contexts 317.

In accordance with an embodiment, the plurality of functions can be provided be default on a plurality of operating systems, for example, Linux or UNIX, or created by a user based on one or more requirements of the user.

Figure 4:
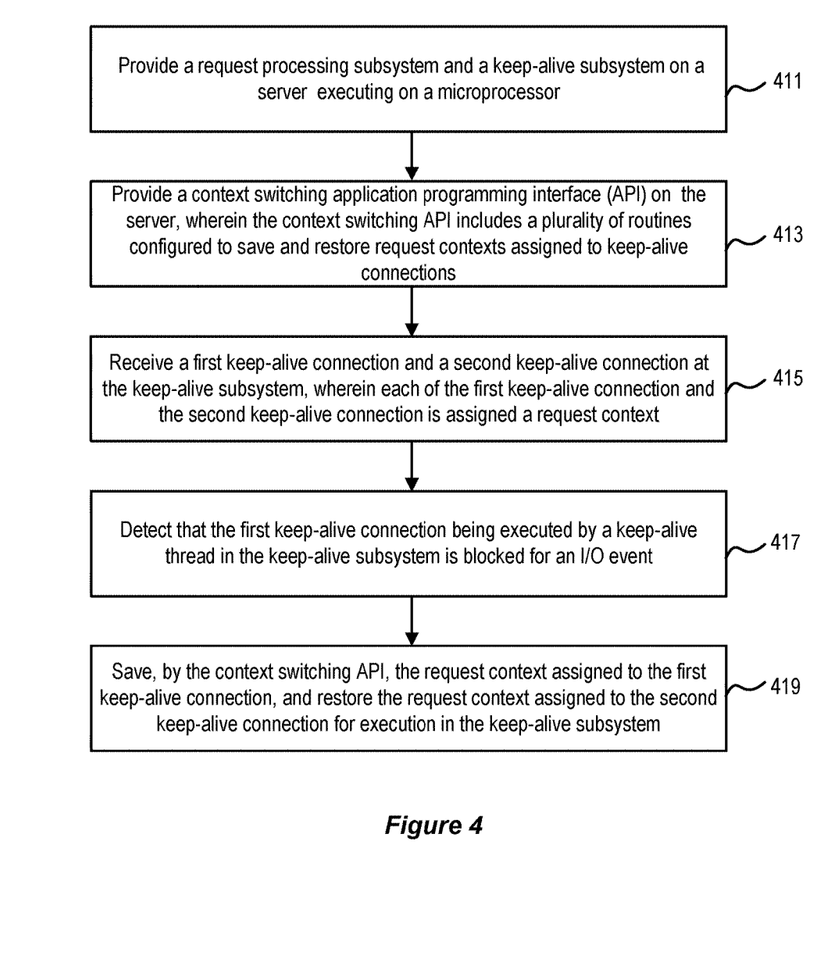
FIG. 4 illustrates a method for converting a synchronous architecture in a server to an asynchronous architecture, in accordance with an embodiment.

FIG. 4 illustrates a method for converting a synchronous architecture in a server to an asynchronous architecture, in accordance with an embodiment.

As shown in FIG. 4, at step 411, a request processing subsystem and a keep-alive subsystem are provided on a server executing on a microprocessor.

At step 413, a context switching application programming interface (API) is provided on the server, wherein the context switching API includes a plurality of routines configured to save and restore request contexts assigned to keep-alive connections.

At step 415, a first keep-alive connection and a second keep-alive connection are received at the keep-alive subsystem, wherein each of the first keep-alive connection and the second keep-alive connection is assigned a request context.

At step 417, the first keep-alive connection being executed by a keep-alive thread is blocked for an I/O event.

At step 419, the context switching API saves the request context assigned to the keep-alive first connection, and restores the request context assigned to the second keep-alive connection for execution in the keep-alive subsystem.

Coexistence of Two Types of Architectures in a Server

Server software comes with either an asynchronous architecture or a synchronous architecture. While an asynchronous architecture is preferred for its increased scalability and resource optimization, a synchronous architecture has its own advantages in terms of simplicity, debug-friendliness, better exploitation of hardware concurrency, and context switch capabilities at an operating system level.

Further, many legacy applications require a synchronous architecture that can provide a dedicated thread per request, so that the applications can use resources and functionalities available only to a synchronous architecture. For example, an application may need to use a thread-specific storage.

Existing servers do not support the coexistence of the two types of architectures. The lack of such a support can be a significant limitation, forcing enterprise users to make software selections based on applications and/or performance requirements, or even to split their application-space across multiple different servers.

In accordance with an embodiment, the system and method described herein can support the coexistence of an asynchronous architecture and a synchronous architecture in a same server, enabling a user to access benefits of both architectures. An async-enabled request acceptor and an async-disabled request acceptor can be configured in the server. The async-enabled request acceptor can direct connections to the keep-alive subsystem, where the connections can be serviced in an asynchronous fashion. The async-disabled request acceptor can direct connections to a request processing subsystem where the connections are serviced in a synchronous fashion.

In accordance with an embodiment, the two types of request acceptors can be configured using a server-level configuration, e.g., a server.xml.

In accordance with an embodiment, the system can include a user-level context switching API that enables each keep-alive thread in the keep-alive subsystem to manage multiple connections simultaneously. The request context for a connection can be executed until an I/O block is detected, at which point the request context can be swapped out and the request context of another ready connection can be swapped in.

In accordance with an embodiment, the coexistence of the two types of architectures enables clients to access a synchronous connection handling interface, and an asynchronous connection handling interface; and provides support for applications that require high concurrency and scalability, and legacy applications that require a synchronous architecture providing a dedicated thread per request.

Figure 5:
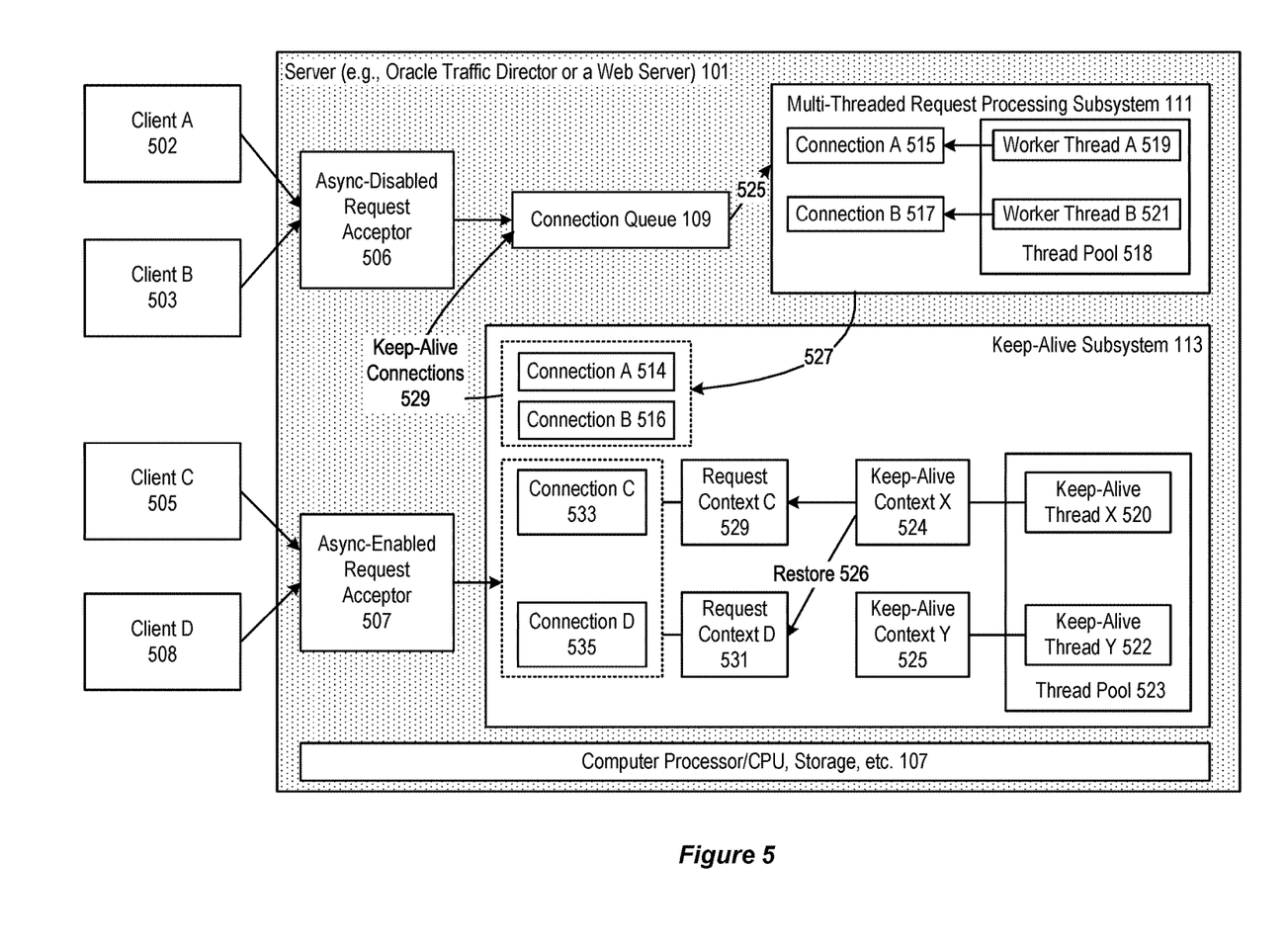
FIG. 5 illustrates a system for supporting the coexistence of an asynchronous architecture and a synchronous architecture in a server, in accordance with an embodiment.

FIG. 5 illustrates a system for supporting the coexistence of an asynchronous architecture and a synchronous architecture in a server, in accordance with an embodiment.

In accordance with an embodiment, the system can include an async-disabled request acceptor 506, and an async-enabled request acceptor 507. The async-disabled request acceptor can direct connections to the multi-threaded request processing subsystem 111 where the connections are handled in a synchronous fashion. The async-enabled request acceptor can direct connections to the keep-alive subsystem 113 where the connections can be handled in an asynchronous fashion.

In accordance with an embodiment, each of the async-disabled request acceptor and the async-enabled request acceptor can be an HTTP listener representing a socket that has an IP address, a port number, a server name, and a default virtual server. The server name can be a host name that appears in a URL that a client uses to access an application deployed on the server.

As shown in FIG. 5, the async-disabled request acceptor 506 can accept requests from client A 502 and client B 503. The connections over which the requests are received can be put on the connection queue 109. Each connection can be dequeued 525 and processed by a worker thread in a thread pool 518.

For example, connection A 515 used to receive requests from client A can be processed by worker thread A 519, and connection B 517 used to receive requests from client B can be processed by worker thread B 521.

In accordance with an embodiment, the connections directed to the multi-threaded request processing subsystem can be moved 527 to the keep-alive subsystem 113, as shown by connection A 514 and connection B 516. The keep-alive subsystem can keep the connections alive there for a period of time as specified in a server configuration (e.g. server.xml), and put back 529 on the connection queue 109 to process additional requests.

As further shown, in FIG. 5, connections used to receive requests from client C 505 and client D 508 can be directed by the async-enabled request acceptor to the keep-alive subsystem, where each connection (for example, connection C 533 and connection D 535) can be assigned a request context (for example, request context C 529 or request context D 531); and can remain in the keep-alive subsystem for the duration of their life.

In accordance with an embodiment, the keep-alive subsystem can include a plurality of keep-alive threads (for example, keep-alive thread X 520 and keep-alive thread Y 521) in a thread pool 523. Each keep-alive thread can be associated with a keep-alive context, for example, keep-alive context X 524 and keep-alive context Y 525.

In accordance with an embodiment, when connection C 533 is blocked for I/O during its execution by keep-alive thread X 520, request context C 529 can be saved and request context D 531 assigned to connection D 535 can be restored 526 for execution by keep-alive thread A, thereby enabling keep-alive thread A to manage multiple request contexts.

In accordance with an embodiment, since each request context is associated with a different connection in the keep-alive subsystem, by using a keep-alive thread to handle multiple request contexts, the keep-alive thread effectively handle multiple connections, which results in increased concurrency and scalability for the same number of keep-alive threads.

Figure 6:
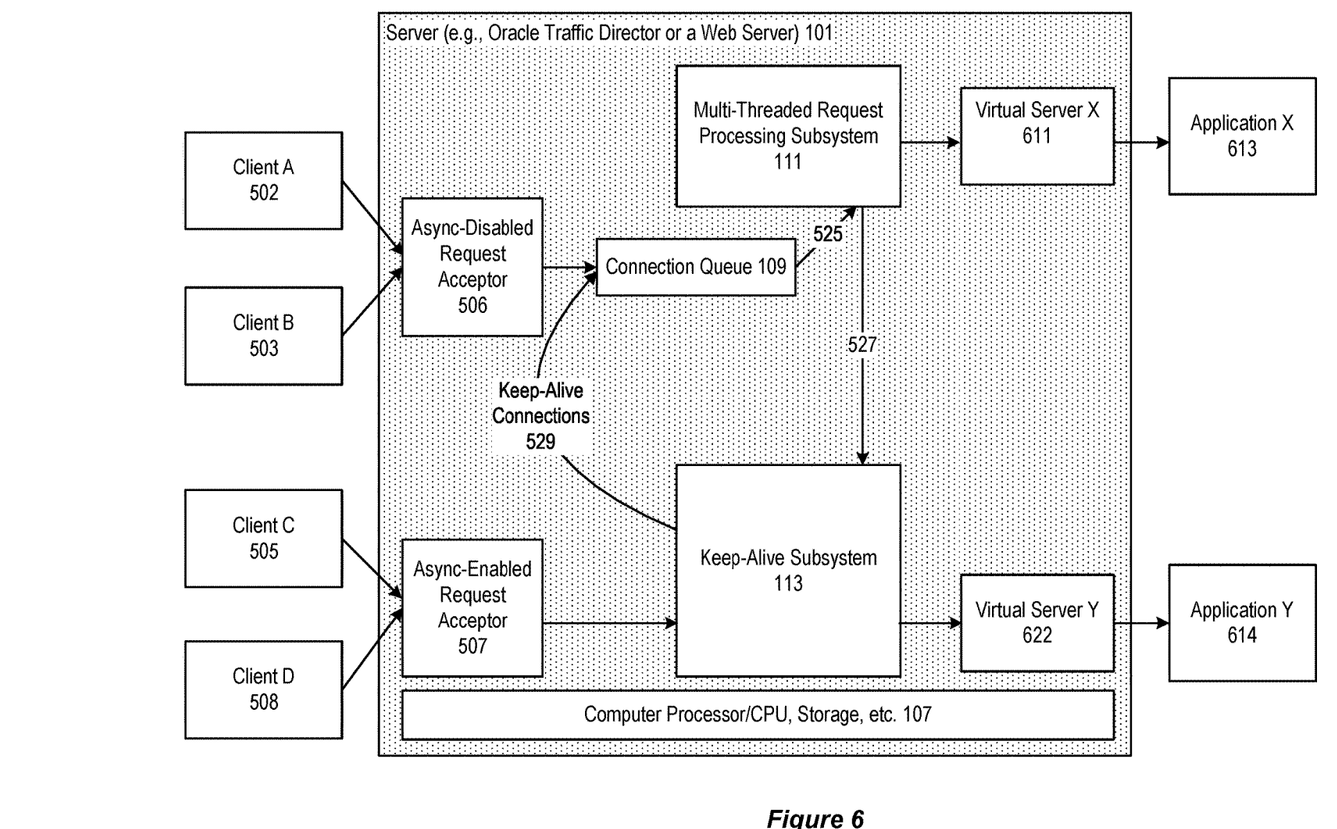
FIG. 6 further illustrates a system for supporting the coexistence of an asynchronous architecture and a synchronous architecture in a server, in accordance with an embodiment.

FIG. 6 further illustrates a system for supporting the coexistence of an asynchronous architecture and a synchronous architecture in a server, in accordance with an embodiment.

In accordance with an embodiment, FIG. 6 illustrates that a plurality of virtual servers can be used with their own request acceptors, which allows an administrator to configure access to different types of applications using different request acceptors.

In accordance with an embodiment, the async-disabled request acceptor can be configured to direct connections to a legacy application (for example, application X 613) through virtual server X 611. For example, the legacy application can require a synchronous architecture that provides a dedicated thread per-request to allow the legacy application to use thread-specific storage.

Similarly, the async-enabled request acceptor can be configured to direct connections to an application requiring high concurrency requirements (for example, application Y 614) through virtual server Y 622.

Figure 7:
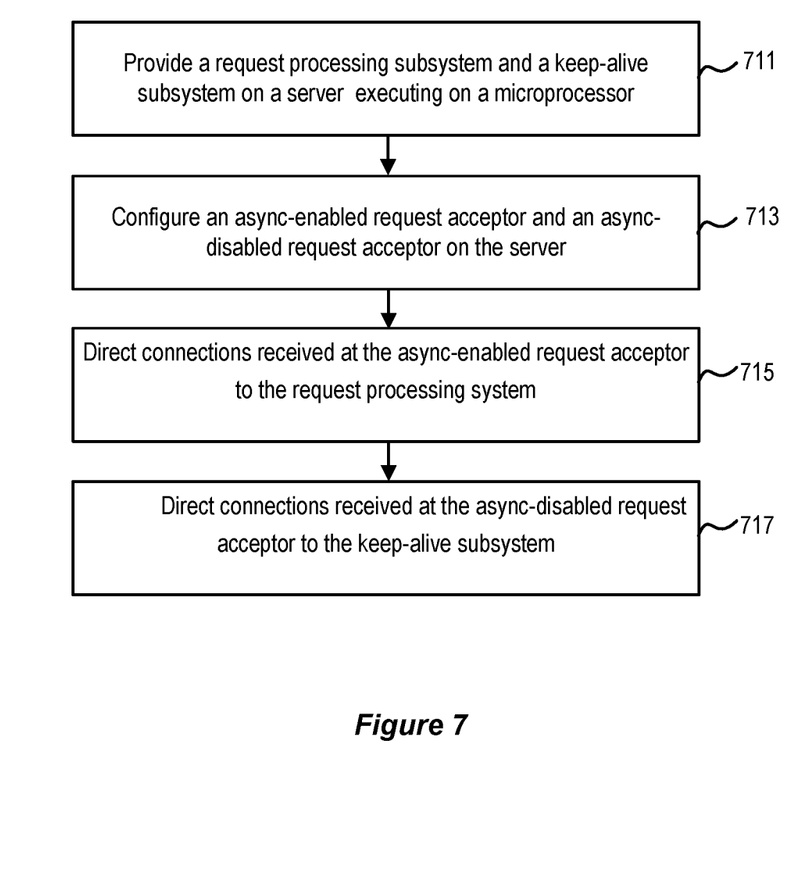
FIG. 7 illustrates a method for supporting the coexistence of an asynchronous architecture and a synchronous architecture in a server, in accordance with an embodiment.

FIG. 7 illustrates a method for supporting the coexistence of an asynchronous architecture and a synchronous architecture in a server, in accordance with an embodiment.

As shown in FIG. 7, at step 711, a request processing subsystem and a keep-alive subsystem are provided on a server executing on a microprocessor.

At step 713, an async-enabled request acceptor and an async-disabled request acceptor are configured on the server.

At step 715, a plurality of connections received at the async-disabled request acceptor are directed to the request processing system, where the connections are handled in a synchronous fashion.

At step 717, a plurality of connections received at the async-enabled request acceptor are directed to the keep-alive subsystem, where the connections are handled in an asynchronous fashion.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for providing an asynchronous architecture in a server, the system comprising:
    a microprocessor;
    a server, executing on the microprocessor, wherein the server comprises a request processing subsystem processing requests directed to the request processing subsystem, and a keep-alive subsystem selectively keeping alive for reuse keep-alive connections used to process the requests directed to the request processing subsystem; and
    a context switching application programming interface (API), the context switching API comprising a plurality of routines configured to save and restore request contexts assigned to the keep-alive connections,
    wherein a first keep-alive connection received at the keep-alive subsystem is a persistent connection assigned a first request context and kept alive for a first period of time,
    wherein a second keep-alive connection received at the keep-alive subsystem is a persistent connection assigned a second request context and kept alive for a second period of time, wherein the context switching API operates to, when the first keep-alive connection being executed by a keep-alive thread is blocked for an I/O event, save the first request context assigned to the first keep-alive connection, and restore the second request context assigned to the second keep-alive connection for execution of the second keep-alive connection by the keep-alive thread, wherein when a keep-alive connection of the keep alive connections is idle, a resource associated with the idle keep-alive connection is recycled.

2. The system of claim 1, wherein the server comprises at least one of an application server, an HTTP server, and/or a traffic director.

3. The system of claim 1, wherein the context switching API comprises a user-level context switching API comprising a plurality of UNIX-provided context manipulation routines.

4. The system of claim 1, wherein when the keep-alive connection of the keep-alive connections is idle, the resource associated with the idle keep-alive connection is recycled by disassociating the resource associated with the idle keep-alive connection from the idle keep-alive connection and adding the disassociated resource to a resource pool for reuse by keep-alive connections other than the idle keep-alive connection.

5. The system of claim 1, wherein the first request context assigned to the first keep-alive connection and the second request context assigned to the second keep-alive connection represent a hardware context of a running thread at any given instance.

6. The system of claim 5, wherein the first request context assigned to the first keep-alive connection is configured to be dissociated with the first keep-alive connection, and wherein the second request context assigned to the second keep-alive connection is configured to be dissociated with the second keep-alive connection.

7. The system of claim 1, wherein each of the first keep-alive connection and the second keep-alive connection, when idle, is put back in a connection queue.

8. A method for providing an asynchronous architecture in a server, the method comprising:
providing on a server executing on a microprocessor a request processing subsystem and a keep-alive subsystem, the request processing subsystem processing requests directed to the request processing subsystem and the keep-alive subsystem selectively keeping alive for reuse keep-alive connections used to process the requests directed to the request processing subsystem;
providing a context switching application programming interface (API) on the server, wherein the context switching API comprises a plurality of routines configured to save and restore request contexts assigned to the keep-alive connections;
receiving a first keep-alive connection at the keep-alive subsystem, wherein the first keep-alive connection is a persistent connection assigned a first request context and kept alive for a first period of time;
receiving a second keep-alive connection at the keep-alive subsystem, wherein the second keep-alive connection is a persistent connection assigned a second request context and kept alive for a second period of time;
detecting by the context switching API that the first connection being executed by a keep-alive thread is blocked for an I/O event;
selectively saving, by the context switching API based on the detecting by the context switching API that the first connection being executed by the keep-alive thread is blocked for the I/O event, the first request context assigned to the first keep-alive connection, and restoring the second request context assigned to the second keep-alive connection for execution of the second keep-alive connection by the keep-alive thread; and
selectively recycling, when a keep-alive connection is idle, a resource associated with the idle keep-alive connection.

9. The method of claim 8, wherein the server comprises at least one of an application server, an HTTP server, and/or a traffic director.

10. The method of claim 8, wherein the context switching API comprises a user-level context switching API comprising a plurality of UNIX-provided context manipulation routines.

11. The method of claim 8, wherein the selectively recycling the resource associated with the idle keep-alive connection comprises disassociating the resource associated with the idle keep-alive connection from the idle keep-alive connection and adding the disassociated resource to a resource pool for reuse by keep-alive connections other than the idle keep-alive connection.

12. The method of claim 8, wherein the first request context assigned to the first keep-alive connection and the second request context assigned to the second keep-alive connection represent a hardware context of a running thread at any given instance.

13. The method of claim 12, wherein the first request context assigned to the first keep-alive connection and the second keep-alive connection is configured to be dissociated with the first keep-alive connection, and wherein the second request context assigned to the second keep-alive connection is configured to be dissociated with the second keep-alive connection.

14. The method of claim 8, wherein each of the first keep-alive connection and the second keep-alive connection, when idle, is put back in a connection queue.

15. A non-transitory computer readable storage medium, including instructions stored thereon which when read and executed by one or more computers cause the one or more computers to perform a method comprising:
providing a request processing subsystem and a keep-alive subsystem on a server executing on microprocessor, the request processing subsystem processing requests directed to the request processing subsystem and the keep-alive subsystem selectively keeping alive for reuse keep-alive connections used to process the requests directed to the request processing subsystem;
providing a context switching application programming interface (API) on the server, wherein the context switching API comprises a plurality of routines configured to save and restore request contexts assigned to the keep-alive connections;
receiving a first keep-alive connection at the keep-alive subsystem, wherein the first keep-alive connection is a persistent connection assigned a first request context and kept alive for a first period of time;
receiving a second keep-alive connection at the keep-alive subsystem, wherein the second keep-alive connection is a persistent connection assigned a second request context and kept alive for a second period of time;
detecting by the context switching API that the first connection being executed by a keep-alive thread is blocked for an I/O event;
selectively saving, by the context switching API based on the detecting by the context switching API that the first connection being executed by the keep-alive thread is blocked for the I/O event, the first request context assigned to the first connection, and restoring the second request context assigned to the second keep-alive connection for execution of the second keep-alive connection by the keep-alive thread; and selectively recycling, when a keep-alive connection is idle, a resource associated with the idle keep-alive connection.

16. The non-transitory computer readable storage medium of claim 15, wherein the server comprises at least one of an application server, an HTTP server, and/or a traffic director.

17. The non-transitory computer readable storage medium of claim 15, wherein the context switching API comprises a user-level context switching API comprising a plurality of UNIX-provided context manipulation routines.

18. The non-transitory computer readable storage medium of claim 15, wherein the selectively recycling the resource associated with the idle keep-alive connection comprises disassociating the resource associated with the idle keep-alive connection from the idle keep-alive connection and adding the disassociated resource to a resource pool for reuse by keep-alive connections other than the idle keep-alive connection.

19. The non-transitory computer readable storage medium of claim 15, wherein the first request context assigned to the first keep-alive connection and the second request context assigned to the second keep-alive connection represent a hardware context of a running thread at any given instance.

20. The non-transitory computer readable storage medium of claim 19, wherein the first request context assigned to the first keep-alive connection is configured to be dissociated with the first keep-alive connection, and wherein the second request context assigned to the second keep-alive connection is configured to be dissociated with the second keep-alive connection.

21. The non-transitory computer readable storage medium of claim 15, wherein each of the first keep-alive connection and the second keep-alive connection, when idle, is put back in a connection queue.

* * * * *